United States Patent
Canale et al.

(10) Patent No.: US 9,611,053 B2
(45) Date of Patent: Apr. 4, 2017

(54) METHOD OF FACILITATING THE APPROACH TO A PLATFORM

(71) Applicant: AIRBUS HELICOPTERS, Marignane (FR)

(72) Inventors: Nicolas Canale, Marseille (FR); Lionel Iraudo, Saint Cannat (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/748,632

(22) Filed: Jun. 24, 2015

(65) Prior Publication Data

US 2015/0375872 A1 Dec. 31, 2015

(30) Foreign Application Priority Data

Jun. 26, 2014 (FR) ...................... 14 01433

(51) Int. Cl.
| | | |
|---|---|---|
| B64D 45/04 | (2006.01) | |
| G05D 1/06 | (2006.01) | |
| G05D 5/02 | (2006.01) | |
| G08G 5/02 | (2006.01) | |

(52) U.S. Cl.
CPC ........... B64D 45/04 (2013.01); G05D 1/0676 (2013.01); G05D 1/0684 (2013.01); G08G 5/025 (2013.01)

(58) Field of Classification Search
CPC .... B64D 45/04; G05D 1/0676; G05D 1/0684; G08G 5/025
USPC ........................................................ 701/16
See application file for complete search history.

(56) References Cited

U.S. PATENT DOCUMENTS

| | | | |
|---|---|---|---|
| 6,629,023 B1 | 9/2003 | Silder, Jr. et al. | |
| 8,626,364 B2 | 1/2014 | Moresve | |
| 8,886,373 B2 | 11/2014 | Garrec et al. | |
| 2007/0181750 A1 | 8/2007 | Astruc | |
| 2010/0168939 A1* | 7/2010 | Doeppner | G08G 5/025 701/16 |
| 2011/0307126 A1* | 12/2011 | Hogstrom | G05D 1/0684 701/16 |
| 2012/0130566 A1* | 5/2012 | Anderson | G05D 1/0684 701/16 |

FOREIGN PATENT DOCUMENTS

| | | |
|---|---|---|
| EP | 0682332 | 11/1995 |
| EP | 2175338 | 4/2010 |
| FR | 2937010 | 4/2010 |
| FR | 2944128 | 10/2010 |

OTHER PUBLICATIONS

Non-Final Office Action for U.S. Appl. No. 14/748,628, Dated Apr. 19, 2016, 10 Pages.

(Continued)

*Primary Examiner* — Yazan Soofi
(74) *Attorney, Agent, or Firm* — Brooks Kushman P.C.

(57) ABSTRACT

A method of facilitating the approach to a platform by an aircraft. The value of the required position integrity performance (RNP) is determined for a localization system. During an approach stage, this position integrity performance (RNP) is compared with a position integrity radius (HPL) resulting from the use of a GNSS localization system, and an alert is generated if the position integrity radius (HPL) is greater than the position integrity performance (RNP).

28 Claims, 4 Drawing Sheets

(56) References Cited

OTHER PUBLICATIONS

French Search Report for French Application No. 1401433, Completed by the French Patent Office on Mar. 12, 2015, 10 Pages.
European Search Report for European Application No. EP 15172234.5, Completed by the European Patent Office, Dated Nov. 25, 2015, 8 Pages.
Esterline CMC Electronics Operational Program, CMA-9000, Operational Program S/W 169-614876-022, Aug. 21, 2008, Part 1, 618 Pages , "Operator's Manual Flight Management System."
Esterline CMC Electronics Operational Program, CMA-9000, Operational Program S/W 169-614876-022, Aug. 21, 2008, Part 2, 628 Pages , "Operator's Manual Flight Management System."
McFarlane., Second GIANT User Forum, Brussels, Oct. 9, 2008, 9 Pages, "A New Procedure for North Sea Helicopter Operations."
U.S. Department of Transportation Federal Aviation Administration, Advisory Circular No. 90-80B, Apr. 12, 1999, XP 055097872, 58 Pages, "Approval of Offshore Standard Approach Procedures, Airborne Radar Approaches, and Helicopter En Route Descent Areas."
Dodson et al. Paper presented at the 23rd European Rotocraft Forum, Dresden, Germany, Sep. 1997, p. 61.1-61.14, "A North Sea Trial to Investigate the use of Differential GPS for Instrument Approaches to Offshore Platforms."
Valner et al. GIANT: GNSS Introduction in the Aviation Sector Jan. 4, 2008, 8 Pages, "EGNOS Offshore Helicopter Approach Procedure."
French Search Report for French Application No. 1401431, Completed by the French Patent Office on Mar. 6, 2015, 8 Pages.

\* cited by examiner

METHOD OF FACILITATING THE APPROACH TO A PLATFORM

CROSS REFERENCE TO RELATED APPLICATION

This application claims priority to French patent application No. FR 14 01433 filed on Jun. 26, 2014, the disclosure of which is incorporated in its entirety by reference herein. This application is related to U.S. application Ser. No. 14/748,628 entitled "A Method Of Facilitating The Approach To A Platform" filed on Jun. 24, 2015.

BACKGROUND OF THE INVENTION (1) Field of the Invention

The present invention relates to a method of facilitating the approach to a platform by an aircraft, and in particular a short landing aircraft, such as an aircraft provided with a rotary wing, for example.

The invention is thus situated in the technical field of systems for providing assistance in piloting an aircraft, and in particular automated systems for providing rotorcraft with assistance in approaching installations at sea.

(2) Description of Related Art

Such an installation at sea is provided with a landing zone on which an aircraft is able to land. Thus, the installation at sea may be a mobile platform, a fixed platform, a ship, or even a barge.

For convenience, an installation of this type is referred to below as a "platform".

A rotary wing aircraft must be able to find and approach platforms safely, regardless of weather conditions and visibility, and while avoiding any obstacles present in the approach area.

The approach is conducted while taking into account: the direction and the speed of the wind in the sector; the type of platform being approached (stationary or mobile platforms, ships, or barges); obstacles in the vicinity (cranes, barges, ships used for positioning the platform, container or super tanker type ships navigating near the approach area, or other platforms in the vicinity); and the comfort of passengers.

Platform approaches are generally made up of the following flight segments.

Thus, the approach comprises an arrival segment that connects the last flight point of the flight stage in progress to an initial approach point referred to as the initial approach fix (IAF). The arrival segment is sometimes positioned at an altitude of 1500 feet (ft). It should be recalled that one foot (ft) is equivalent to 30.48 centimeters (cm).

An initial approach segment may connect the initial approach fix IAF to a final approach point referred to as the final approach fix (FAF). The purpose of this segment is to align the aircraft, to decelerate, and to prepare for the final approach segment.

At least one final approach segment connects the final approach fix FAF to a decision point referred to as a missed approach point (MAP).

If a pilot establishes visual contact with the platform at the decision point, the pilot may land the aircraft on that platform.

However, if visual contact with the platform is not obtained at this point in the approach, it is necessary to follow a segment referred to as the go-around segment. The go-around segment may also be followed at any moment in the approach if the crew judges that to be useful. The aim of this go-around segment is to reach a safe altitude.

During adverse weather conditions, an instrument approach is likely to stress the crew, who must pilot the aircraft manually in order to guide it towards a zone in which visual acquisition of the platform can be obtained.

During the transition between the instrument flight stage and the visual flight stage, the crew must constantly be switching between what is displayed on the piloting screens of the instrument panel and what is observed outside in order to detect any sign/visual indication making it possible to confirm the position of the platform (lights, portions in relief). This manner of approaching a platform is therefore not the most practical and may sometimes create errors in interpretation, for example in the presence of fog causing visual acquisition of the landing target to be lost temporarily.

Instrument approaches to a platform or a moving vessel are generally performed without using a navigation computer, referred to as a Flight Management System (FMS), and without the aircraft autopilot being coupled with an approach path predefined by the Flight Management Systems (FMS).

At present, certain platforms are fitted with a device, referred to as a "Non Directional Beacon" (NDB), that is used by the crew via the navigation computer as means for assisting navigation and for correlating the position of the aircraft with relative accuracy, but these means do not enable an approach flight plan to be constructed.

A navigation computer is known that is used to provide horizontal guidance during the en route stage, where the en route stage corresponds to the stage of flight being followed before the approach flight stage. For the approach flight stage, and as means for providing assistance in navigation, the crew determines an off-route target point corresponding to the coordinates of the platform to be reached. However, the navigation computer does not segment the various stages of the approach towards the platform in order to servo-control the autopilot on the guidance data (horizontal or vertical deviation, speed setpoint).

The approach is thus performed manually or semi-automatically with the assistance of certain advanced modes of the autopilot by using the approach charts published by operators and approved by local authorities.

Furthermore, the weather radar of the aircraft may be used as means for identifying the platform and for detecting and avoiding temporary or permanent obstacles during the approach and the final descent.

Document US 2010/0168939 proposes a module and an automated method of approaching a platform on an approach path constructed from approach points.

In that document US 2010/0168939, a pilot inputs into a module of the aircraft:

the coordinates of the target platform to be reached;
a final approach course towards the platform;
an offset distance extending laterally between the path to be followed by a path directed towards the platform following that approach heading; and
a descent height.

Under such circumstances, the aircraft module determines in particular the position of the initial approach fix IAF and of the final approach fix FAF in response to the data as input. The aircraft is thus directed towards the initial approach fix IAF.

Thus, the constructed approach path includes a horizontal segment connecting an initial approach fix IAF to a final approach fix FAF.

Then, the path has a descent segment and a leveling-off segment in order to connect the final approach fix FAF to a decision point MAP.

The initial approach fix IAF, the final approach fix FAF, and the decision point MAP are contained in a vertical plane parallel to the selected approach course. It should be understood that "vertical plane" refers to a plane extending in the gravity direction, points of said vertical plane being located at various altitudes.

The vertical plane is offset relative to the platform by a distance equal to the input offset distance.

The technological background also includes the following documents:

Esterline CMC electronics, CMA-9000 flight management system operator's manual, operational program S/W 169-614876-022, publication No 9000-GEN-0105, itel N). 930-6000088-00, Aug. 21, 2008;

N. McFarlane, A new procedure for North Sea Helicopter Operations, Second GIANT use forum, Brussels, Belgium, Oct. 9, 2008;

K. M. Dodson and J. R. A. Stevens, A North Sea trial to investigate the use of Differential GPS for instrument Approaches to Offshore Platforms, paper presented at the 23rd European Rotorcraft Forum, Dresden, Germany, September 1997; and Advisory circular AC 90-80Bn of Dec. 4, 1999.

Documents FR 2937010, EP 2175338, EP 0682332, US 2012/0130566, US 2011/0307126, and FR 2944128 are also known.

BRIEF SUMMARY OF THE INVENTION

An object of the present invention is thus to provide an approach method aiming to assist a crew in landing an aircraft on a platform.

According to the invention, a method of facilitating the approach to a platform by an aircraft comprises:

a preparatory step of constructing a database of platforms including for each platform at least one attribute defining said platform, such as an attribute naming the platform or an attribute relating to the position of a zone of the platform;

a parameter-setting step during which parameters are set for a distance referred to as the "lateral distance"; and an approach flight stage along an approach path comprising an initial approach fix IAF, a final approach fix FAF, and a decision point MAP that are present in a common vertical plane directed parallel to a course, the target platform to be reached being offset relative to said vertical plane by an orthogonal distance that is not less than a lateral distance;

This method is remarkable in particular in that the following steps are performed:

during said preparatory step, a step of storing, for each platform, an attribute relating to a positioning error TPE of the platform;

prior to the approach flight stage that commences at the initial approach fix, a step of using an integrity-checking module to determine the value of a position integrity performance required for a localization system of the aircraft, this position integrity performance being equal to the minimum value between firstly a predetermined performance threshold and, secondly, the quotient of the difference of said lateral distance minus said positioning error (TPE) for a target platform to be reached as divided by two, i.e.:

$$RNP=\min[(LOV-TPE)/2;k3]$$

in which "RNP" represents the position integrity performance required, "LOV" represents said lateral distance, "TPE" represents said positioning error, "k3" represents said predetermined threshold performance, and "/" represents the division sign;

during a monitoring step performed during the approach flight stage, said aircraft being provided with a GNSS (global navigation satellite system) localization system determining the radius of a circle in which said aircraft is located referred to as the position integrity radius;

using the integrity-checking module to compare the position integrity performance RNP with the position integrity radius; and generating an alert if the position integrity radius is greater than the position integrity performance.

The course of the aircraft to be followed corresponds to the direction to be followed during the approach flight stage.

The lateral distance represents an offset distance separating the path to be followed laterally, at least in part, from of a path directed towards the platform following the approach course.

During the approach flight stage, the aircraft may be guided by a conventional GNSS localization system that is suitable for using various constellations such as the global positioning system GPS, GALILEO, wide area augmentation system (WAAS), European geostationary navigation overlay service (EGNOS), . . . , or else by a GNSS localization system used in association with an inertial unit for reinforcing the integrity of the calculated position.

Nonetheless, such a GNSS localization system includes greater or lesser positioning uncertainty, in particular in view of the geometry of the constellation of the GNSS localization system used and of the measurement errors of each of the satellites in the constellation of said GNSS localization system used.

Under these circumstances, a pilot may think that the aircraft is following the prepared path, whereas the aircraft is in fact following a real path that is parallel to the prepared path. If the position integrity provided by the GNSS localization system is insufficient, this real path may lead the aircraft towards a position that is too close to the target platform and that may give rise to risks of conflicts that are contrary to the sought-after object aiming to be certain of the approach path.

This problem is further associated with the fact that a platform is not totally stationary on the water. The means for holding a platform in position allow it some freedom of movement. Thus, a platform may move in a circle having the positioning error TPE as its radius.

A fixed platform thus conventionally has a small positioning error TPE, whereas a mobile platform may have a positioning error TPE that is greater.

Each stored platform is thus associated with an attribute of the positioning error type TPE.

Consequently, this method aims to prevent the aircraft from heading straight towards a target platform.

Next, an integrity-checking module determines the value of the position integrity performance RNP as a function of the value of the lateral distance and of the positioning error. The value of the position integrity performance is referred to simply as the "position integrity performance".

During the approach flight stage the integrity-checking module is used to compare the position integrity performance RNP with the position integrity radius.

Conventionally, an ordinary localization system determines not a position of the aircraft but rather a circle within which the aircraft is located, said circle being centered on a geographical position and presenting the position integrity radius. The localization system may also evaluate a circle in which the aircraft is shortly to be located, the circle being centered on a predicted geographical position and presenting a radius referred to as the predicted radius.

Under such circumstances, the localization system can transmit the position integrity radius to the integrity-checking module.

If the position integrity radius is greater than the position integrity performance RNP, an alert is generated to interrupt the approach.

Under such circumstances, the method makes it possible to verify that the accuracy of a localization system does not risk leading the aircraft onto a platform, instead of causing it to follow a path that is offset relative to said platform.

This method may also include one or more of the following additional characteristics.

Thus, the aircraft may include a horizontal situation indicator (referred to as a course deviation indicator (CDI)) provided with a scale having a plurality of markers, said horizontal situation indicator positioning on said scale a first symbol centered in the middle of the scale indicating the approach path and a second symbol indicating the difference in lateral position of the aircraft relative to said approach path to be followed (cross track), the difference between said first symbol and the adjacent second marker representing the value of the required position integrity performance.

Thus, the scale comprises a first marker adjacent to the first symbol, and a second marker adjacent to the first marker. Consequently, the first marker is located mid-way between the first symbol and the second marker referred to as the "second adjacent marker".

Such an indicator enables a pilot to follow a path. Under such circumstances, the size of the scale of the indicator is slaved to the position integrity performance RNP.

This characteristic also aims to avoid the aircraft being directed towards the platform involuntarily.

If the second symbol representing the lateral difference in position of the aircraft relative to the path to be followed deviates beyond the first marker that is the closest to the middle of the scale, then the approach must be interrupted by the crew. Under such circumstances, if the second symbol is displayed between the first marker and the second marker for example, the approach must be interrupted.

Furthermore, the predetermined threshold performance may have a value of 0.3 nautical miles (Nm).

In addition, and in a first variant, during the parameter-setting step, said lateral distance to be used is determined by:

automatically calculating the value of a minimum theoretical distance that is equal to the sum of said positioning error of the target platform, of a predetermined margin, and of twice a maximum value between firstly said current position integrity radius and, secondly, a predicted radius provided by the GNSS localization system indicating the position integrity radius that will be reached at the end of a predetermined time period, i.e.:

$$\text{COMPUTED } LOV = 2 * \max[HPL, HPL5'] + HPL\text{BUFFER} + TPE$$

in which "COMPUTED LOV" represents said minimum theoretical distance, "TPE" represents said positioning error, "HPL BUFFER" represents said margin, "HPL" represents said position integrity radius, "HPL5'" represents said predicted radius, and "*" represents the multiplication sign; and by comparing said minimum theoretical distance with distances stored in a list, said lateral distance that is to be used being equal to the smallest stored distance that is greater than said minimum theoretical distance.

In this first variant, the lateral distance to be used is determined automatically as a function firstly of a constant relative to a positioning error of the target platform and, secondly, of the position integrity provided by the GNSS localization system.

Consequently, this variant tends to at least limit the risks of generating a path that could lead the aircraft directly towards the target platform or towards a position that is too close to the platform given the measurement inaccuracies of the data used.

According to a second variant, during the parameter-setting step, said lateral distance is set to a stored predetermined value.

In this variant, the system initially uses a lateral distance that is set by the manufacturer.

In a third variant, during the parameter-setting step, the lateral distance is selected by a pilot from a list comprising a plurality of stored lateral distances.

These three variants may be implemented in a single system. Under such circumstances, the pilot may select the variant to be implemented, e.g. as a function of flight conditions.

In addition, since the path is prepared during a construction step, modification of said path is authorized up to a predetermined fixing point located upstream from said initial approach fix.

By way of example, a pilot may modify the path by modifying the data that led to its construction.

The fixing point may be calculated as a function of the position of a point referred to as the "turning point" TP. This turning point corresponds to the point from which the aircraft must turn in order to reach the initial approach fix IAF.

Thus, the fixing point may correspond to the geographical coordinates that will be reached one minute before the turning point TP, for example.

In addition, during a verification step performed prior to said approach flight stage and following a path construction step:

determining whether a lateral distance referred to as a "current lateral distance" that served to prepare the path is compatible with the position integrity radius calculated by the GNSS localization system of the aircraft by:

automatically calculating the value of a minimum theoretical distance that is equal to the sum of said positioning error of the target platform, of a predetermined margin, and of twice a maximum value between firstly said position integrity radius and, secondly, a predicted radius provided by the GNSS localization system indicating the position integrity radius that will be reached at the end of a predetermined time period, i.e.:

$$\text{COMPUTED } LOV = 2 * \max[HPL, HPL5'] + HPL\text{BUFFER} + TPE$$

in which "COMPUTED LOV" represents said minimum theoretical distance, "TPE" represents said positioning error, "HPL BUFFER" represents said margin, "HPL" represents said position integrity radius, "HPL5'" represents said predicted radius, and "*" represents the multiplication sign; and by comparing said current lateral distance with said minimum theoretical distance; and when said current lateral distance is less than said minimum theoretical distance, and using a list comprising a plurality of stored distances, performing the following steps:

abandoning said approach if the greatest stored distance is less than said minimum theoretical distance; or increasing said current lateral distance in order to obtain an amended lateral distance, this amended lateral distance being equal to the smallest stored distance in said list that is greater than said minimum theoretical distance, then said construction step is implemented again by replacing said current lateral distance by said amended lateral distance.

Thus, the method includes a verification step interposed between the construction step and the approach flight stage.

This verification step aims, before the approach flight stage, to verify that the current lateral distance that served to create the path of the approach flight stage and the associated predetermined threshold performance are compatible with the position integrity provided by the GNSS localization system guiding the aircraft.

When this is not true, two alternatives are then envisaged.

If the stored list includes a lateral distance compatible with the position integrity provided by said GNSS localization system, a new approach path is prepared by taking into consideration said lateral distance referred to as the "amended lateral distance".

An alert may be generated in order to alert the crew.

However, if the stored list does not include a lateral distance that is compatible with the position integrity provided by said GNSS localization system, the approach must be abandoned. An alert is therefore generated to this effect.

In addition, this verification step may be implemented automatically or on request, so long as a predetermined waypoint has not been reached.

In a first alternative, implementation of said verification step is authorized so long as the aircraft is situated more than three minutes away from said initial approach fix IAF.

In a second alternative, implementation of said verification step is authorized so long as the aircraft is situated more than two minutes away from a turning point at which the aircraft must turn in order to reach said initial approach fix IAF.

Both alternatives are compatible. By way of example, the verification step becomes impossible to implement if the aircraft is located less than three minutes away from the initial approach fix IAF or less than two minutes away from a turning point.

In addition, in order to prepare the approach path;

during the preparatory step, for at least one platform, attributes defining at least one target zone constituting a destination are stored, said at least one target zone including a geometrical center of the platform, said attributes for said geometrical center comprising geographical coordinates of the geometrical center, at least one height of said geometrical center, and the radius referred to as the "obstacle radius" of a circle centered on the geometrical center in which the platform lies;

during the parameter-setting step, the parameters for the following information are set using a parameter-setting module:

a target zone referred to as the "selected target zone" selected from the stored target zones;

a course to be followed in order to reach said target platform provided with the selected target zone; and a height parameter relative to a minimum decision altitude of a decision point for a final approach descent towards said target platform; and during a construction step implemented by a navigation module, if said selected target zone is a geometrical center, said approach path is constructed by determining the position of the initial approach fix IAF, of the final approach fix FAF, and of the decision point MAP in response to said information and to said attributes of the selected target zone, the initial approach fix IAF as well as the final approach fix FAF and the decision point MAP being present in said vertical plane directed parallel to said course, said geometrical center being offset relative to said vertical plane by said orthogonal distance equal to the sum of said lateral distance plus said obstacle radius.

It is recalled that a "height" represents the vertical distance between a body and a floor surface, while an "altitude" represents the vertical distance between a body and sea level. The height of an aircraft is usually measured by a radio altimeter by means of electromagnetic waves, and altitude is measured by an altimeter via measurement of pressure.

Consequently, the height and the altitude of an aircraft or of a landing zone of a platform above the sea make reference to distances that are equivalent if the altimeter is calibrated with the pressure at sea level, which corresponds to the QNH. QNH usually represents barometric pressure corrected for instrument errors of temperature and gravity and adjusted to mean sea level in application of the standard characteristics of the atmosphere.

Under such circumstances, the method implements an approach along a vertical plane that is laterally offset relative to a platform.

In addition, this method introduces a novel parameter in order to prepare said approach path. The novel parameter is the radius of a circle in which the target platform lies and is referred to as the "obstacle radius".

A platform may include a plurality of zones in which an aircraft can land. In addition, such a zone may be relatively far away from an end of the platform.

Under such circumstances, a path that is greatly offset laterally relative to such a zone risks being offset only a little relative to an end of the platform.

The method of the invention makes it possible to overcome this by defining a geometrical center and an obstacle radius. Thus, the approach path takes into consideration the geometrical features specific to the target platform, unlike paths based only on the coordinates of a platform.

Thus, the method makes it possible to facilitate the work of a crew by making it easy to prepare the path to be followed. The parameter-setting step may also be semi-automatic by proposing default options to said crew, the crew possibly merely validating the proposed options, or else modify them.

In addition, this method may include a guidance step of providing guidance during the calculated initial approach fix IAF. A guidance member then guides the aircraft towards said initial approach fix.

The guidance member may comprise a horizontal and/or vertical guidance module communicating with an autopilot system in order to guide the aircraft along the approach path prepared by the navigation module.

By way of example, the parameter-setting module, the navigation module, a horizontal guidance module, and a vertical guidance module are implemented in a navigation computer known as a flight management system (FMS). This navigation computer may then provide guidance data to an autopilot system in order to guide the aircraft along the prepared path.

It is also possible to display information on the flight instruments so that the pilot can direct the aircraft manually along the prepared path. By way of example, an optimal heading to be followed or a descent speed are displayed in order to help the pilot to follow this path. By way of example, this heading is selected in order to place the aircraft facing the wind.

In addition, during the preparatory step, for at least one platform, attributes are stored that define at least one target zone of the landing zone type distinct from said geometrical center, the stored attributes including geographical coordinates of this landing zone and at least one height for said landing zone.

Consequently, during the construction step, if said selected target zone is a landing zone, the positions of an initial approach fix IAF, of a final approach fix FAF, and of a decision point MAP are determined in response to said information and to said attributes of the target zone, the initial approach fix IAF as well as the final approach fix FAF and the decision point MAP being present in said vertical plane directed parallel to said course, and said landing zone being offset relative to said vertical plane by an orthogonal distance equal to said lateral distance.

Consequently, for at least one platform, the database may comprise attributes including:

the name of the platform;

data about the geometrical center of the platform and in particular its position, i.e. the geographical coordinates of said geometrical center, a height for said geometrical center, and the obstacle radius of the platform; and data about at least one landing zone and in particular its position, i.e. the geographical coordinates of said landing zone, and at least a height for said landing zone.

In this variant, an operator selects a target platform, and then a target zone.

However, the name of the platform is not essential. By way of example, each landing zone and each geometrical center may include an attribute comprising both an identifier and the name of the platform.

Under such circumstances, it is not necessary to select a platform and then a zone of said platform.

In addition, the height of the geometrical center may be made equal to the height of the highest landing zone.

Under such circumstances, an operator may choose to direct the aircraft towards the platform by selecting directly or indirectly a target zone that may either be the geometrical center or a landing zone of a platform.

By way of example, a navigation computer displays said geometrical center, the landing zones, and the course to be followed on a screen. Under such circumstances, the operator may consider that a path based on the geometrical center runs the risk of positioning the decision point MAP at a considerable distance from a landing zone.

If the configuration of the platform makes this possible, the operator may then prefer to select a target zone of the landing zone type.

In addition, during the parameter-setting step:

either a pilot manually sets parameters for said minimum decision altitude MDA;

or said minimum decision altitude MDA is determined automatically by the navigation module, said minimum decision altitude MDA being the maximum value between firstly a threshold altitude and, secondly, the sum of said height of the selected target zone plus a minimum decision constant predetermined by the manufacturer.

Thus, the crew may select manual parameter setting in order to determine the minimum decision altitude MDA. To this end, the crew may input said minimum decision altitude MDA, or validate a default altitude, for example.

However, the navigation unit may also automatically determine the appropriate minimum decision altitude MDA using relationships stored and established by the manufacturer.

By way of example, the minimum decision altitude MDA may be the maximum value between firstly a threshold altitude and, secondly, the sum of said landing height plus a constant.

In particular, the navigation module may determine the arrival time at the platform, the threshold altitude varying depending on said arrival time.

By way of example, the threshold altitude may be at a height of 200 ft during a day flight for example, and 300 ft during a night flight.

To this end, the navigation module uses predetermined and stored forward speeds between the various calculated waypoints in order to estimate the arrival time.

The first variant and the second variant are compatible with each other. Thus, during the parameter-setting step a crew may select one or the other of these variants.

In addition, during the parameter-setting step, an offset side on the vertical plane may be selected relative to the target platform.

The crew may select to position the decision point to the left or to the right of the target platform, where left and right are relative to the movement direction of the aircraft towards the platform.

In a variant or in addition, the method may impose an offset side. By way of example, the database may specify an offset side, e.g. in order to avoid an identified obstacle.

Furthermore, the decision point MAP may be positioned by determining a longitudinal distance D1 separating it from a tangent plane passing through the geographical coordinates of the selected target zone and orthogonal to the vertical plane in accordance with the following relationship:

$$D1 = D0/[\tan(\alpha)]$$

in which "/" represents the division sign, "D0" represents said orthogonal distance, and "α" represents an offset angle set by the manufacturer. By way of example, said offset angle may be of the order of 30 degrees. Furthermore, the final approach fix FAF may be positioned at a minimum safe altitude MSA, said minimum safe altitude MSA being equal to the maximum value between firstly a threshold minimum safe altitude and, secondly, the sum of a height of a top of the target platform plus a minimum safe constant predetermined by the manufacturer.

In addition, the final approach fix FAF is possibly positioned at a final approach distance from the decision point MAP equal to:

$$DFAF = k1 + \frac{MSA - MINI}{\tan \beta}$$

in which "DFAF" represents the final approach distance, "k1" represents an approach constant set by the manufacturer, e.g. of the order of one nautical mile, "MSA" represents a minimum safe altitude at which the final approach fix is positioned, e.g. of the order of 1500 ft, "MINI" represents said minimum decision altitude MDA, e.g. of the order of 200 ft, and "β" represents the angle of a flight descent segment connecting the final approach fix to a horizontal plane containing said decision point MAP, e.g. of the order of 3.75 degrees.

Furthermore, the initial approach fix IAF may be positioned at the minimum safe altitude MSA for the final approach fix FAF.

Furthermore, said initial approach fix IAF is possibly positioned at an initial approach distance from the decision point MAP equal to:

$$DIAF = k1 + \frac{MSA - MINI}{\tan \beta} + k2$$

in which "DIAF" represents the initial approach distance, "k1" represents an approach constant set by the manufacturer, "k2" represents a variable determined by the manufacturer, e.g. of the order of two nautical miles, "MSA" represents a minimum safe altitude at which the final approach fix is positioned, "MINI" represents said minimum decision altitude MDA, and "β" represents the angle of a flight descent segment connecting the final approach fix to a horizontal plane containing said decision point MAP.

In a variant, the approach path includes a leveling-off point LPO interposed between the final approach fix FAF and the decision point MAP, the leveling-off point being placed at the same minimum decision altitude MDA as the decision point MAP and at a leveling-off distance DLPO from the decision point MAP equal to:

$$DLPO = k1$$

in which "DLPO" represents the leveling-off distance, and "k1" represents an approach constant set by the manufacturer.

It is recalled that the unit "Nm" refers to one nautical mile, which is equivalent to 1852 meters.

BRIEF DESCRIPTION OF THE SEVERAL VIEWS OF THE DRAWINGS

The invention and its advantages appear in greater detail in the context of the description below with examples given by way of illustration and with reference to the accompanying figures, in which.

Elements that are present in more than one of the figures are given the same references in each of them.

DETAILED DESCRIPTION OF THE INVENTION

Figure 1:
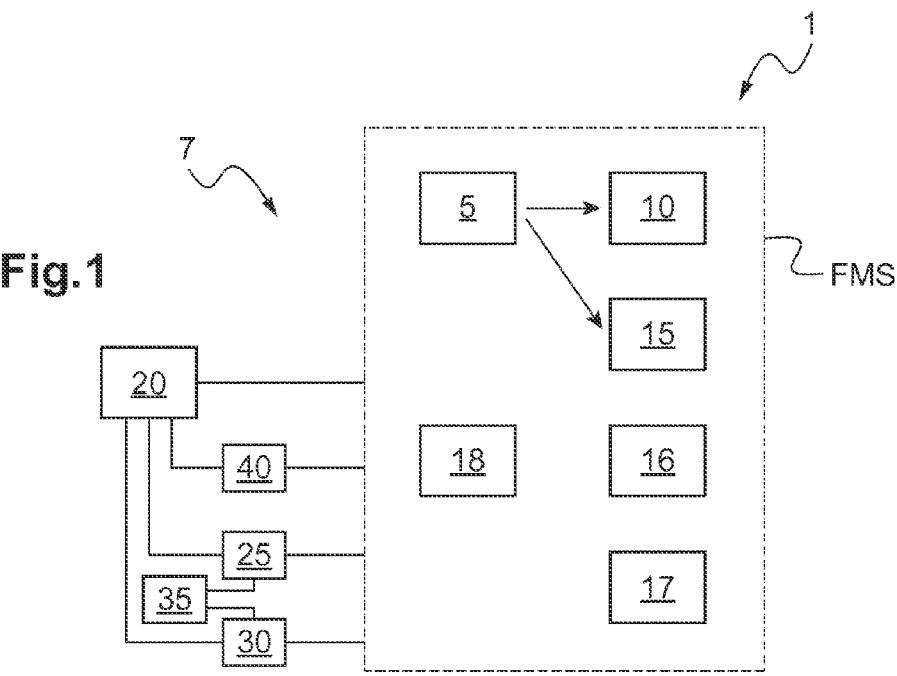
FIG. 1 is a diagram presenting an aircraft implementing the method of the invention.

FIG. 1 presents an aircraft 1, and in particular a rotary wing aircraft that is suitable for landing on a platform at sea.

This aircraft 1 is provided with a navigation assistance system 7 including an onboard database 5 communicating with a parameter-setting module 10.

By way of example, the parameter-setting module 10 includes a visual display unit, data entry means that are operable by a crew, a memory, and a computing member of the processor type, e.g. executing stored instructions.

In addition, the navigation assistance system includes a navigation module 15 that is suitable for being connected both to the database 5 and to the parameter-setting module 10. As a function of the elements transmitted by the database 5 as well as by the parameter-setting module 10 and possibly by stored elements, the navigation module 15 automatically prepares an approach path.

By way of example, the navigation module 15 includes a visual display unit, data entry means that are operable by a crew, a memory, and a computing member of the processor type, e.g. executing stored instructions.

The navigation module 15 may then communicate with a vertical guidance module 25 and/or with a horizontal guidance module 30 that generate setpoints transmitted to an autopilot system 35. The autopilot system thus acts on control means in order to control the aircraft. Reference may be made to the literature in order to obtain information about such an autopilot system or such guidance modules.

Furthermore, each guidance module may communicate with a GNSS localization system 20. This GNSS localization system 20 may be a conventional system or a hybrid system with an inertial unit.

The navigation module may also communicate with the instruments and controls, possibly via the guidance modules. Thus, data about the actions to be performed in order to follow the prepared path may be displayed on the instruments onboard the aircraft.

In particular, the system 7 may comprise a horizontal situation indicator 40 connected to the GNSS localization system 20 in order to display the path to be followed and a representation of the aircraft relative to this path.

In addition, the system may comprise a verification module 17 for verifying that the prepared path is compatible with the position integrity calculated by the GNSS localization system 20. By way of example, the verification module 17 includes a visual display unit, data entry means that are operable by a crew, a memory, and a computing member of the processor type, e.g. executing stored instructions.

Furthermore, the system may comprise an integrity-checking module 16 for verifying during an approach flight stage that the path being followed is compatible with the current position integrity calculated by the GNSS localization system 20. By way of example, the integrity-checking module 16 includes a visual display unit, data entry means that are operable by a crew, a memory, and a computing member of the processor type, e.g. executing stored instructions.

By way of example, at least one of the parameter-setting module 10, the navigation module 15, the integrity-checking module 16, and the verification module 17 forms part of a navigation computer (flight management system (FMS)).

Figure 2:
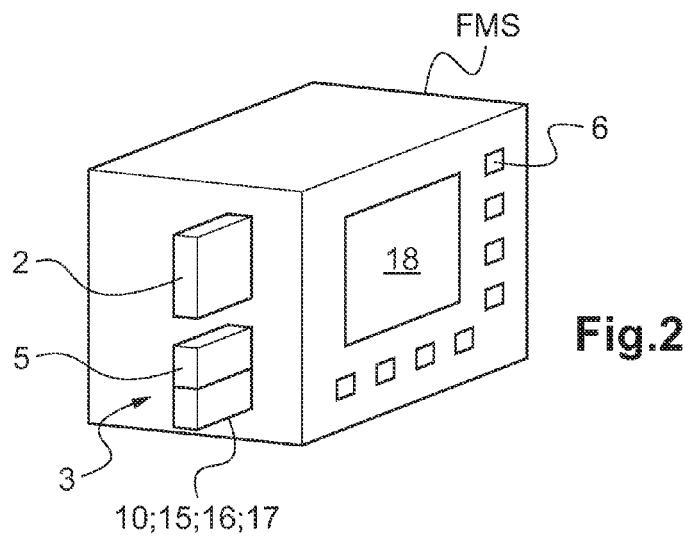
FIG. 2 is a diagram presenting a navigation computer of that aircraft.

With reference to FIG. 2, the navigation computer FMS comprises a casing carrying a screen 18 and multiple push buttons 6. Said casing housing a calculation unit 2 executing instructions stored in a storage unit 3.

Under such circumstances, this storage unit 3 may comprise at least one memory storing instructions, e.g. in the form of segments of code.

Segments of code associated with the calculation unit may thus represent respectively the parameter-setting module 10, the navigation module 15, the integrity-checking module 16, and the approach monitoring module 17.

In addition, the database 5 may be stored in a memory of the storage unit 3.

Such a navigation computer FMS is thus in communication via multiple interfaces with the GNSS localization system 20, the horizontal situation indicator 40, the vertical guidance module 25, and/or the horizontal guidance module 30.

Figure 3:
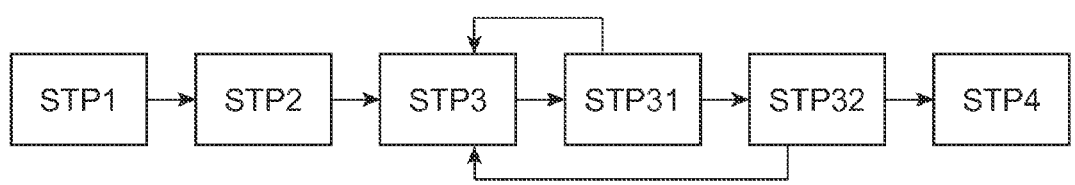
FIG. 3 is a diagram presenting the method of the invention.

FIG. 3 presents various steps of a method of the invention implemented by a navigation assistance system 7.

During a preparatory step STP1, a user prepares the database 5. This user prepares a list of platforms likely to constitute a destination for the user's aircraft.

Under such circumstances, the user stores a plurality of attributes in the database 5 for each platform selected. These attributes may include an identifier ID for the platform.

Figure 7:
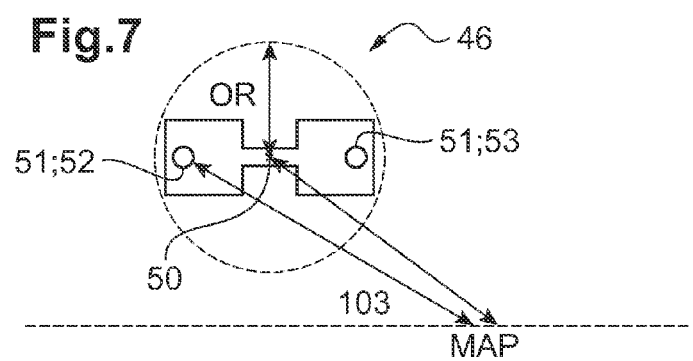

In addition and with reference to FIG. 7, these attributes define at least one target zone per platform.

The database 5 need not be provided with a platform identifier. Under such circumstances and by way of example, the identifier of the target zones may, comprise a reference with the name of the corresponding platform.

In particular, these attributes define a target zone marking a geometrical center 50 of the platform 46. Thus, the attributes include the geographical coordinates of said geometrical center 50, a height for said geometrical center, and the radius referred to as the "obstacle radius" OR of a circle centered on the geometrical center 50 in which the platform lies.

In addition, these attributes may define at least one target zone marking a landing zone 51. Thus, the attributes include the geographical coordinates of said landing zone and a height of said landing zone.

Furthermore, these attributes may comprise a maximum height of the platform, i.e. the height of the top of the platform.

In addition, each target zone of a platform may be associated with an attribute qualifying a positioning error of the platform.

Figure 9:
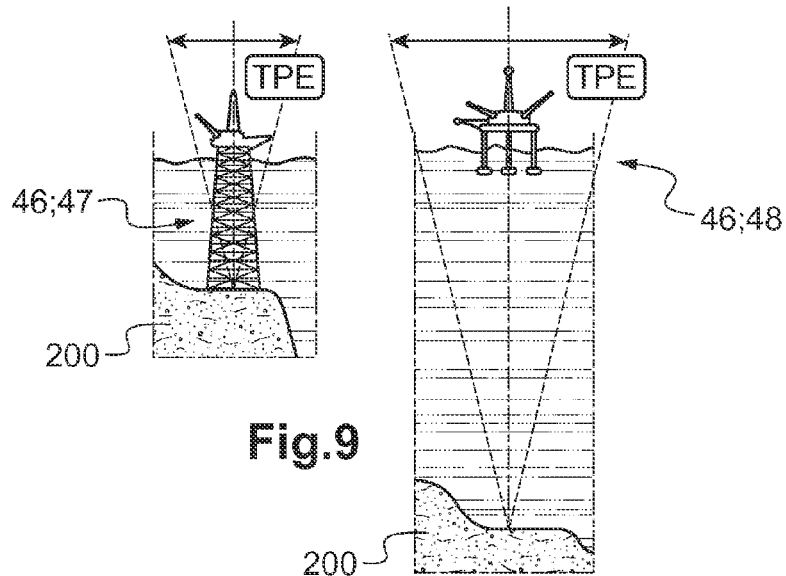

With reference to FIG. 9, a platform 46 may be a so-called "fixed" platform 47 resting on the sea bottom 200.

Under such circumstances, the freedom of movement of the fixed platform 47 around the geographical coordinates of the stored target zones is small. The positioning error TPE of such a fixed platform is thus relatively small.

However, a platform 46 may be a so-called "mobile" platform 48 anchored on the sea bottom 200. Under such circumstances, the freedom of the mobile platform 48 to move around the geographical coordinates of the stored target zones is considerable. The positioning error TPE of such a mobile platform is thus relatively large.

Consequently, the database associates each target zone with multiple attributes, these attributes including information specific to the corresponding platform and/or specific to the target zone.

With reference to FIG. 3, the crew of an aircraft may implement a parameter-setting step STP2 in order to set parameters for the approach to a platform.

To this end, a plurality of parameters are set or are settable during this parameter-setting step STP2.

Thus, the crew may select the target platform on which the aircraft is to land.

Figure 4:
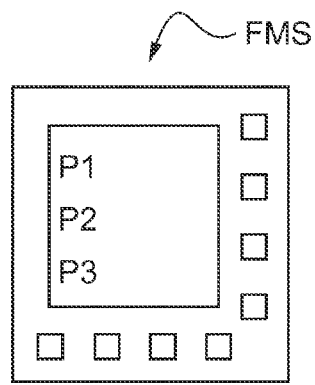
FIGS. 4 to 9 are diagrams explaining a parameter-setting step.

With reference to FIG. 4, the parameter-setting module 10 may present the list of platforms P1, P2, P3 stored in the database 5. The crew may, for example, select the platform P1 using the navigation computer FMS.

Figure 5:
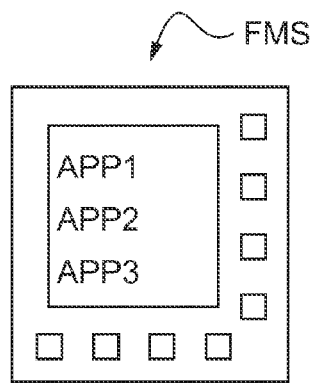

With reference to FIG. 5, and optionally, the parameter-setting module 10 may for example present various types of available approaches. It should be observed that the database may possibly include an attribute for stored platforms making reference to these types of approach.

This approach list may in particular include an approach of the airborne radar approach (ARA) type, or also an approach of the DELTA30 Offshore standard procedure (OSAP) type, or an offset approach of the OFFSET type of the invention.

Figure 6:
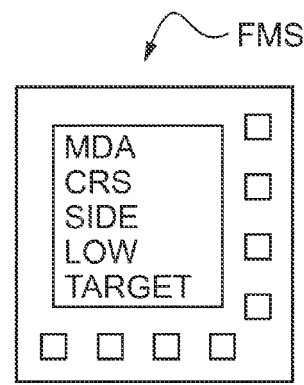

With reference to FIG. 6, the parameter-setting module 10 enables the crew of the aircraft to set other parameters. By way of example, the parameter-setting module 10 may present values by default for the parameter settings, it may also enable a user to select values from a list, or it may even execute instructions for calculating said information as a function of additional data.

During this parameter-setting step, the system 7 makes it possible to set parameters for the target zone of the platform to be reached, represented by the term "TARGET" in the example of FIG. 6. The crew then selects a target zone from the list of target zones associated with the selected target platform.

In a variant, an operator may directly select a target zone, without firstly determining a target platform to be reached.

In addition, the system 7 makes it possible to set parameters for a minimum decision altitude MDA at which the decision point MAP is located. The minimum decision altitude MDA can refer to an altitude determined with a radioaltimeter or a height determined with an altimeter settled to the QNH.

In a first variant, the crew specifies that the minimum decision altitude MDA is to be set manually, and sets such a parameter. For safety reasons, the manufacturer may impose a minimum decision altitude. By way of example, the manufacturer may decide that the minimum decision altitude MDA should not be less than 300 ft, or not less than the sum of the height of the selected target zone plus a security margin. This margin may be of the order of 50 ft.

In a second variant, the crew specifies that the parameters for the minimum decision altitude MDA should be set automatically.

Under such circumstances, the minimum decision altitude MDA is either a threshold altitude, or the sum of the height HDECK of the selected target zone plus a minimum decision constant that is predetermined by the manufacturer. The higher of these values is then used.

The threshold altitude may depend on visibility conditions, and in particular on whether landing takes place by day or by night. Thus, the threshold altitude may be 200 ft for landing by day and 300 ft for landing by night.

Consequently, if necessary, the navigation module 15 may perform preprocessing in order to estimate the arrival time at the target platform provided with the selected target zone so as to determine whether landing will take place by day or by night.

In the example presented, and where necessary, the crew may select an offset side SIDE in order to determine where the platform is located relative to the vertical plane containing the decision point MAP.

Said decision point corresponds to a point at which the crew must decide either to fly towards the platform in order to land, or to implement an alternative procedure if landing proves impossible.

The parameter-setting module 10 makes it possible, in particular during the parameter-setting step STP2, to set parameters for a course CRS to be followed in order to reach the selected target zone.

The course parameters may be set manually by the crew.

Figure 8:
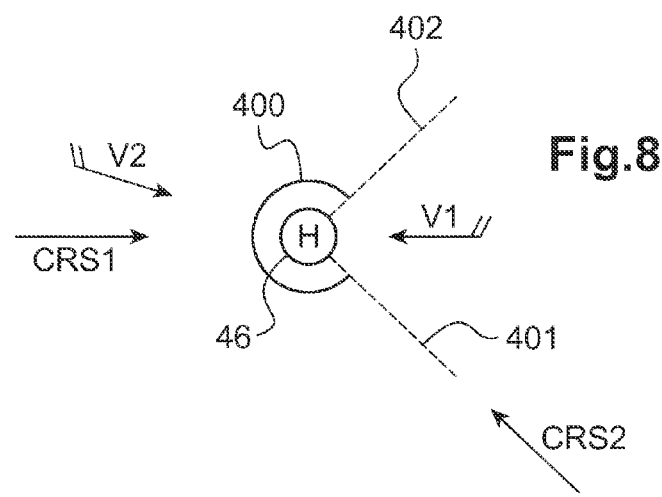

However, and with reference to FIG. 8, the course CRS may be determined automatically by the system 7.

The system 7 may comprise a meteorological device connected to the navigation computer in order to transmit to it the wind direction V1, V2 at the target platform.

Said wind direction parameter may also be set by the crew.

Under such circumstances, the navigation computer consults the database in order to determine whether the selected target zone is associated with an angular sector approach 400.

Otherwise, the set course is then selected so as to be into the wind.

Conversely, the navigation computer determines if a course into the wind is contained within the angular sector 400 approach. If so, the set course is then selected so as to be into the wind. Otherwise, the set course is then selected to be directed along the nearest limit 401, 402 of the angular sector 400.

In the first example shown, the first wind direction V1 makes it possible for the first course CRS1 to be into the wind.

However, the second wind direction V2 leads to placing the second course CRS2 along a limit 401 of the angular sector 400.

Furthermore, and with reference to FIG. 3, during the parameter-setting step, the system 7 sets a parameter for a lateral distance LOV.

In a first variant, the lateral distance parameter LOV is set by a crew. Thus, said crew selects a lateral distance LOV, e.g. based on a list comprising a plurality of stored lateral distances.

In a second variant, the parameter-setting module 10 sets the lateral distance at a stored predetermined value.

In a third variant, the parameter-setting module 10 calculates the lateral distance.

Consequently, the parameter-setting module 10 calculates a theoretical minimum distance COMPUTED LOV by applying the following first relationship:

$$COMPUTED\ LOV=2*\max[HPL,HPL5']+HPLBUFFER+TPE$$

in which "COMPUTED LOV" represents said minimum theoretical distance, "TPE" represents said positioning error of the selected target platform, "HPL BUFFER" represents a stored constant margin, "HPL" represents a current position integrity radius, "HPL5'" represents a predicted radius, and "*" represents the multiplication sign.

The position integrity radius referred to as "current" represents the position integrity radius determined at the current instant at which the minimum theoretical distance is calculated. Conversely, the predicted radius represents the position integrity radius that will be reached at the end of a predetermined duration.

The position integrity radius HPL (Horizontal Protection Limit) and the predicted radius HPL5' are data that is usually determined by a GNSS localization system. This data is therefore transmitted to the parameter-setting module 10 via said GNSS localization system.

Under such circumstances, the parameter-setting module 10 compares the calculated minimum theoretical distance with distances stored in a list.

The parameter-setting module 10 thus considers that the value of the lateral distance is equal to the value of the shortest stored distance that is greater than said minimum theoretical distance.

By way of example, assume that the calculated minimum theoretical distance has a value of 0.38 Nm. Furthermore, the list of distances possibly includes the following distances: 0.25, 0.3, 0.35, 0.4, 0.5, 0.6, 0.75. Under such circumstances, the parameter-setting module 10 automatically sets the lateral distance parameter by assigning it the value of 0.4 Nm.

At the end of the parameter-setting step, the system 7 prepares an approach path by using the attributes and the parameters that were set.

During a construction step STP3, the navigation module prepares an approach path to be followed in order to reach the selected target zone as a function of the attributes present in the database 5, and of parameters that were set during the parameter-setting step STP2.

Figure 10:
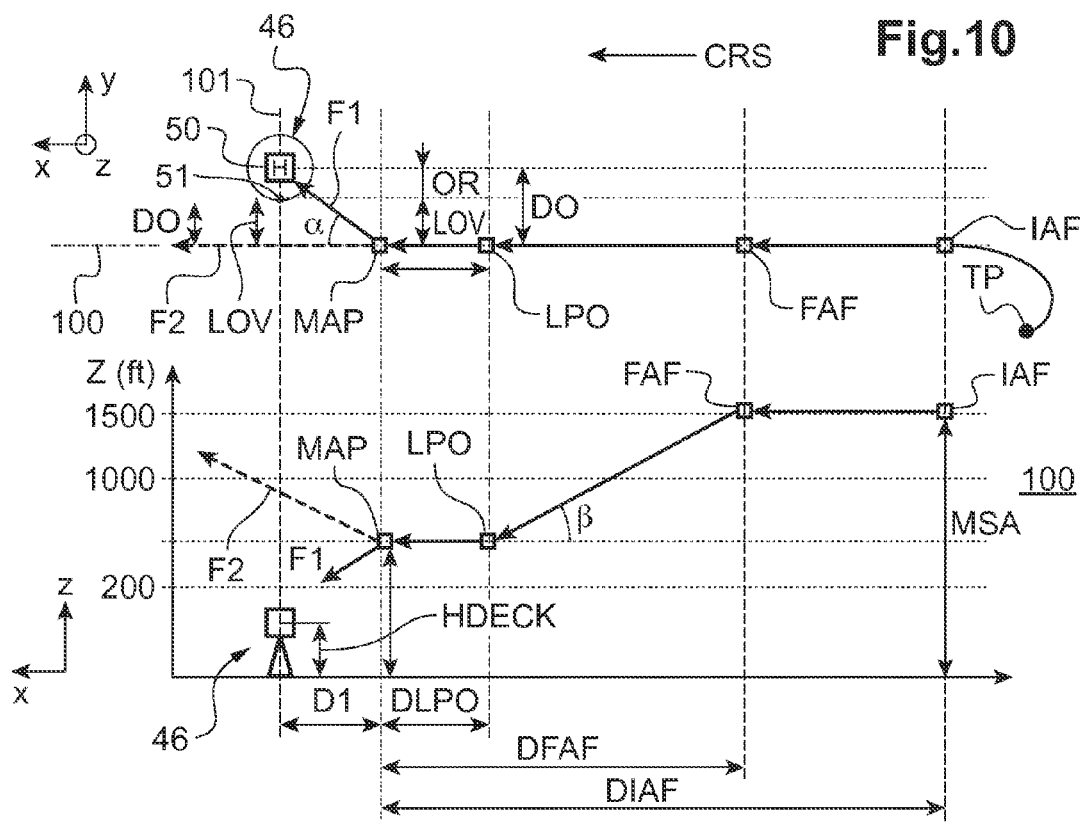
FIG. 10 is a diagram presenting the constructed approach path.

FIG. 10 presents the path prepared by the navigation module. More precisely, the bottom portion of FIG. 10 presents a side view in elevation of the path prepared for reaching a selected target zone of a platform 46. The top portion of FIG. 10 presents a plan view of the prepared path.

The navigation module determines in particular the position of an initial approach fix IAF, of a final approach fix FAF, and of a decision point MAP as a function of said information and said attributes.

Possibly, a leveling-off point LPO is also determined.

The initial approach fix IAF, the final approach fix FAF, the decision point MAP, and possibly the leveling-off point LPO are arranged in a common vertical plane 100. Said vertical plane 100 is parallel to the course CRS as set.

However, the vertical plane 100 is offset laterally by an orthogonal distance D0 relative to the platform, and in particular to the selected target zone. Thus, said vertical plane 100 is not directed onto the target platform.

Whether the offset is to be to the left or to the right of the vertical plane relative to the platform is a setting that might be set during the parameter-setting step STP2.

If the selected target zone is the geometrical center of the platform, the orthogonal distance D0 is equal to the sum of the previously set lateral distance LOV plus the obstacle radius OR associated with the selected target zone.

If the selected target zone is a landing zone 51, the orthogonal distance D0 is equal to the previously set lateral distance LOV.

The decision point MAP and possibly the leveling-off point LPO are placed at a height equal to the minimum decision altitude MDA.

Furthermore, the navigation module determines the position of the decision point MAP by determining a longitudinal distance D1 separating it from a tangent plane 101 passing through the geographical coordinates of the selected target zone and orthogonal to the vertical plane 100 in accordance with the following relationship:

$$D1=D0/[\tan(\alpha)]$$

in which "/" represents the division sign, "D0" represents said orthogonal distance, and "α" represents an offset angle set by the manufacturer.

The offset angle α may have a value of 30 degrees.

With reference to FIG. 8, the decision point is further from or closer to a landing zone as a function of the target zone selection.

By way of example, if the crew has selected the geometrical center as the target, the landing zone 52 located to the left of the geometrical center is relatively far away from the decision point MAP. Conversely, the landing zone 52 located to the right of the geometrical center is relatively close to the decision point MAP.

Under such circumstances, during the parameter-setting step, the system may display the informations of FIG. 8 in a representation on a screen. Under such circumstances, a crew may select the target zone that is the best suited to its needs.

With reference to FIG. 10, if the approach path includes a leveling-off point LPO, the leveling-off point is placed at a leveling-off distance DLPO equal to:

$$DLPO=k1$$

in which "DLPO" represents the leveling-off distance, and "k1" represents an approach constant set by the manufacturer.

In addition, the final approach fix FAF and the initial approach fix IAF are arranged at a minimum safe altitude MSA.

Said minimum safe altitude MSA is either equal to a threshold minimum safe altitude HMSS, or equal to the sum of a stored height HPFM of top of the platform to be reached plus a minimum safe constant CMIN predetermined by the manufacturer. The higher value of the two values thus obtained is then used, i.e.:

$$MSA = \max(HMSS, CMIN + HPFM)$$

The threshold minimum safe altitude HMSS may have a value of 1000 ft. In addition, the minimum safe constant CMIN may have a value of 500 ft.

The final approach fix FAF is thus positioned at a final approach distance DFAF from the decision point MAP equal to:

$$DFAF = k1 + \frac{MSA - MINI}{\tan \beta}$$

in which "DFAF" represents the final approach distance, "k1" represents an approach constant set by the manufacturer, "MSA" represents a minimum safe altitude at which the final approach fix is positioned, "MINI" represents said minimum decision altitude MDA, and "β" represents the angle of a flight descent segment connecting the final approach fix to a horizontal plane containing said decision point MAP.

The initial approach fix IAF is thus at an initial approach distance DIAF from the decision point MAP equal to:

$$DIAF = k1 + \frac{MSA - MINI}{\tan \beta} + k2$$

in which "DIAF" represents the initial approach distance, "k1" represents an approach constant set by the manufacturer, "k2" represents a variable determined by the manufacturer, "MSA" represents a minimum safe altitude at which the final approach fix is positioned, "MINI" represents said minimum decision altitude MDA, and "β" represents the angle of a flight descent segment connecting the final approach fix to a horizontal plane containing said decision point MAP.

This path may also include a turning point TP located upstream from the initial approach fix IAF.

When the path is prepared, the method may allow said path to be modified so long as a predetermined fixing point situated upstream from the initial approach fix IAF has not been reached.

By way of example, the path may be permanently frozen one minute before reaching the turning point TP.

Thus, during a modification step STP31, the crew can modify the path.

Furthermore, a verification step STP32 may also be undertaken.

By way of example, this verification step may be performed once, e.g. while the aircraft is situated more than three minutes away from the initial approach fix IAF or while the aircraft is situated more than two minutes away from the turning point TP.

During this verification step, the verification module 17 determines whether the lateral distance referred to as the "current lateral distance" that was used to prepare the path is compatible with the position integrity provided by the GNSS localization system 20.

The verification module 17 then calculates the minimum theoretical distance COMPUTED LOV in accordance with the above-described first relationship by acting on the GNSS localization system 20.

The verification module performs this calculation, even if the calculation was performed during the preparation step STP2. The position integrity provided by the GNSS localization system 20 might have become degraded since performing the preparation step STP2.

Under such circumstances, the verification module 17 compares the current lateral distance with the minimum theoretical distance.

When said current lateral distance is less than said minimum theoretical distance, two alternatives can be envisaged.

Thus, if the greatest stored distance in the above-described list is less than the calculated minimum theoretical distance, then the system 7 warns the crew to abandon the approach by means of an alert of the audible or visual type.

Figure 11:
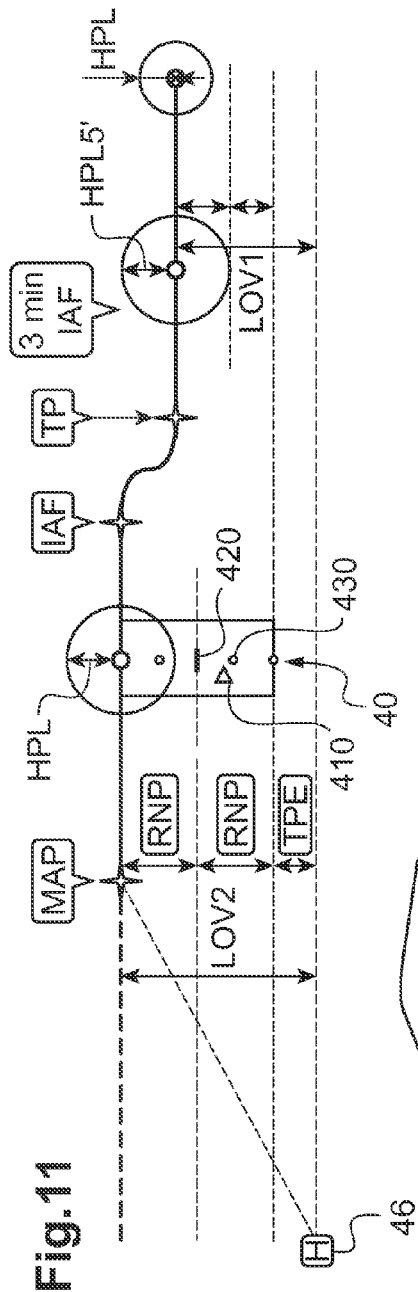
FIGS. 11 and 12 are diagrams explaining the verification step and the integrity-checking step.

Otherwise, and with reference to FIG. 11, the verification module increases the current lateral distance LOV1 in order to obtain an amended lateral distance LOV2. This amended lateral distance LOV2 is equal to the value of the smallest stored distance in said list that is greater than said minimum theoretical distance.

The construction step STP3 is thus implemented once more by replacing said current lateral distance by said amended lateral distance.

Figure 12:
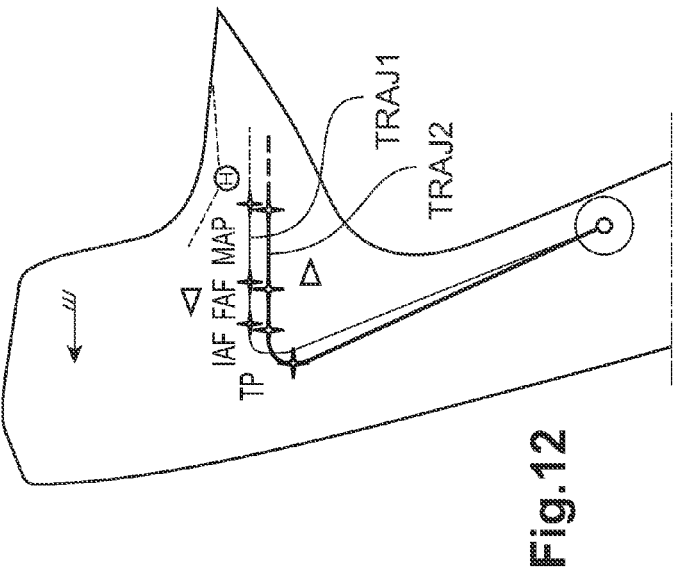

With reference to FIG. 12, the system prepares a new path TRAJ2, by replacing the initial path TRAJ1.

The system 7 may also generate an alert when an amended lateral distance is calculated.

When the path is frozen, the navigation module may require the aircraft to be guided towards the initial approach fix IAF. By way of example, the initial approach fix IAF may be reached by means of a turn passing through a turning point TP.

Under such circumstances, the prepared approach path is followed during an approach flight stage STP4:

either by manually controlling the aircraft operated entirely by the crew, possibly by means of flying assistance data displayed on at least one flight instrument 40;

or by manually controlling the aircraft operated by the crew together with automatic control operated by the autopilot system, the crew managing the vertical flight of the aircraft and the autopilot system managing the horizontal flight of the aircraft, for example;

or by automatic control operated by the autopilot system.

The crew may then select to stop following the approach path, or may even request a modification of the approach path, if necessary.

With reference to FIG. 10, the aircraft is directed towards the decision point MAP. When the decision point is reached, if the crew can see the platform and if landing is possible, the crew follows arrow F1 in order to fly towards the platform. Otherwise, the crew implements a conventional procedure aiming to fly the aircraft along arrow F2 towards an auxiliary path.

During the approach flight stage commencing at the initial approach fix IAF, the method implements an integrity-checking stage.

With reference to FIG. 11, prior to the approach flight stage and once the path has been frozen, an integrity-checking module 16 determines the value of the required position integrity performance RNP for the localization system during the approach, in accordance with the following second relationship:

$$RNP=\min[(LOV-TPE)/2; k3]$$

in which "RNP" represents the required position integrity performance, "LOV" represents the lateral distance that gave rise to the path being followed, "TPE" represents the error in positioning of the target platform, and "k3" represents a threshold integrity performance, e.g. of the order of de 0.3 Nm, and "/" represents the division sign.

During a monitoring step implemented during the approach flight stage, the integrity-checking module compares the position integrity performance RNP with the current position integrity radius HPL transmitted by the GNSS localization system 20.

The integrity-checking module generates an alert if the current position integrity radius HPL is greater than the position integrity performance RNP so that the crew abandons the approach.

Furthermore, FIG. 11 shows a horizontal situation indicator 40.

This horizontal situation indicator 40 is provided with a scale comprising a plurality of markers 430. Under such circumstances, the horizontal situation indicator 40 positions a first symbol 420 on the scale indicating the approach path and a second symbol 410 on the scale indicating the difference in lateral position of the aircraft relative to the path to be followed.

What is claimed is:

1. A method of facilitating the approach to a platform by an aircraft, comprising:
    a preparatory step (STP1) of constructing a database of platforms including for each platform at least one attribute defining the platform;
    a parameter-setting step (STP2) during which parameters are set for a distance referred to as the "lateral distance" (LOV);
    an approach flight stage (STP4) along an approach path comprising an initial approach fix (IAF), a final approach fix (FAF), and a decision point (MAP) that are present in a common vertical plane directed parallel to a course (CRS), the target platform to be reached being offset relative to the vertical plane by an orthogonal distance (D0) that is not less than the lateral distance (LOV);
    during the preparatory step (STP1), a step of storing, for each platform, an attribute relating to a positioning error (TPE) of the platform;
    prior to the approach flight stage commencing at the initial approach fix (IAF), a step of using an integrity-checking module to determine the value of a position integrity performance (RNP) required for a localization system of the aircraft, this position integrity performance (RNP) being equal to the minimum value between firstly a predetermined performance threshold and, secondly, the quotient of the difference of the lateral distance minus the positioning error for a target platform to be reached as divided by two according to the equation:

$$RNP=\min[(LOV-TPE)/2; k3]$$

in which "RNP" represents the required position integrity performance, "LOV" represents the lateral distance, "TPE" represents the positioning error, "k3" represents the predetermined threshold performance, and "/" represents the division sign; and
    during a monitoring step performed during the approach flight stage (STP4), the aircraft being provided with a GNSS localization system determining the radius of a circle in which the aircraft is located referred to as the position integrity radius (HPL);
    using the integrity-checking module to compare the position integrity performance (RNP) with the position integrity radius (HPL); and
    generating an alert if the position integrity radius (HPL) is greater than the position integrity performance (RNP).

2. A method according to claim 1, wherein the predetermined performance threshold has a value of 0.3 Nm.

3. A method according to claim 1, wherein the following steps are performed:
    during the parameter-setting step (STP2), a step of determining the lateral distance (LOV) by:
    automatically calculating the value of a minimum theoretical distance (COMPUTED LOV) that is equal to the sum of the positioning error (TPE) of the target platform, of a predetermined margin (HPL BUFFER), and of twice a maximum value between firstly the position integrity radius (HPL) and, secondly, a predicted radius provided by the GNSS localization system indicating the position integrity radius that will be reached at the end of a predetermined time period according to the equation:

$$\text{COMPUTED } LOV=2*\max[HPL, HPL5']+HPL\text{BUFFER}+TPE$$

in which "COMPUTED LOV" represents the minimum theoretical distance, "TPE" represents the positioning error, "HPL BUFFER" represents the margin, "HPL" represents the position integrity radius, "HPL5'" represents the predicted radius, and "*" represents the multiplication sign; and
    by comparing the minimum theoretical distance with distances stored in a list, the lateral distance being equal to the smallest stored distance that is greater than the minimum theoretical distance.

4. A method according to claim 1, wherein during the parameter-setting step (STP2), the lateral distance (LOV) is set at a stored predetermined value.

5. A method according to claim 1, wherein during the parameter-setting step (STP2), the lateral distance (LOV) is selected by a pilot from a list comprising a plurality of stored lateral distances.

6. A method according to claim 1, wherein since the path is prepared during a construction step (STP3), modification of the path is authorized up until a predetermined fixing point located upstream from the initial approach fix (IAF).

7. A method according to claim 1, wherein during a verification step (STP32) performed prior to the approach flight stage and following a path construction step (STP3) the following steps are performed:
    determining whether a lateral distance referred to as a "current lateral distance" that served to prepare the path is compatible with the position integrity radius calculated by the GNSS localization system of the aircraft by:
    automatically calculating the value of a minimum theoretical distance (COMPUTED LOV) that is equal to the sum of the positioning error (TPE) of the target platform, of a predetermined margin (HPL BUFFER), and of twice a maximum value between firstly the position integrity radius (HPL) and, secondly, a predicted radius provided by the GNSS localization system (20) indicating the position integrity radius that will be reached at the end of a predetermined time period according to the equation:

COMPUTED $LOV=2*\max[HPL,HPL5']+HPL$BUFFER+$TPE$ in which "COMPUTED LOV" represents the minimum theoretical distance, "TPE" represents the positioning error, "HPL BUFFER" represents the margin, "HPL" represents the position integrity radius, "HPL5'" represents the predicted radius, and "*" represents the multiplication sign; and by comparing the current lateral distance with the minimum theoretical distance; and when the current lateral distance is less than the minimum theoretical distance, and using a list comprising a plurality of stored distances, performing the following steps:

abandoning the approach if the greatest distance of the stored distances is less than the minimum theoretical distance (COMPUTED LOV); or increasing the current lateral distance in order to obtain an amended lateral distance, this amended lateral distance being equal to the smallest stored distance in the list that is greater than the minimum theoretical distance, then the construction step is implemented again by replacing the current lateral distance by the amended lateral distance.

8. A method according to claim 7, wherein implementation of the verification step is authorized so long as the aircraft is situated more than three minutes away from the initial approach fix (IAF).

9. A method according to claim 7, wherein implementation of the verification step is authorized so long as the aircraft is situated more than two minutes away from a turning point at which the aircraft must turn in order to reach the initial approach fix (IAF).

10. A method according to claim 7, wherein an alert is generated when an amended lateral distance is calculated.

11. A method according to claim 1, wherein:

during the preparatory step (STP1), for at least one platform, attributes defining at least one target zone constituting a destination are stored, the at least one target zone including a geometrical center of the platform, the attributes for the geometrical center comprising geographical coordinates of the geometrical center, at least one height of the geometrical center, and the radius referred to as the "obstacle radius" (OR) of a circle centered on the geometrical center in which the platform lies;

during the parameter-setting step (STP2), the parameters for the following information are set using a parameter-setting module:

a target zone referred to as the "selected target zone" selected from the stored target zones;

a course (CRS) to be followed in order to reach the target platform provided with the selected target zone; and a height parameter relative to a minimum decision altitude (MDA) of a decision point (MAP) for a final approach descent towards the target platform; and during a construction step (STP3) implemented by a navigation module, if the selected target zone is a geometrical center, the approach path is constructed by determining the positions of the initial approach fix (IAF), of the final approach fix (FAF), and of the decision point (MAP) in response to the information and to the attributes of the selected target zone, the initial approach fix (IAF) as well as the final approach fix (FAF) and the decision point (MAP) being present in the vertical plane directed parallel to the course (CRS), the geometrical center being offset relative to the vertical plane by the orthogonal distance (D0) equal to the sum of the lateral distance (LOV) plus the obstacle radius (OR).

12. A method according to claim 11, wherein:

during the preparatory step (STP1), storing, for at least one platform, attributes that define at least one target zone of the landing zone type distinct from the geometrical center, the stored attributes including geographical coordinates of this landing zone and at least one height for the landing zone; and during the construction step (STP3) if the selected target zone is a landing zone, determining the positions of an initial approach fix (IAF), of a final approach fix (FAF), and of a decision point (MAP) in response to the information and to the attributes of the target zone, the initial approach fix (IAF) as well as the final approach fix (FAF) and the decision point (MAP) being present in the vertical plane (100) directed parallel to the course (CRS), and the landing zone being offset relative to the vertical plane by an orthogonal distance (D0) equal to the lateral distance (LOV).

13. A method according to claim 11, wherein during the parameter-setting step (STP2):

either a pilot manually sets parameters for the minimum decision altitude (MDA);

or the minimum decision altitude (MDA) is determined automatically by the navigation module, the minimum decision altitude (MDA) being the maximum value between firstly a threshold altitude and, secondly, the sum of the height of the selected target zone and of a minimum decision constant predetermined by the manufacturer.

14. A method according to claim 13, wherein the navigation module determines the arrival time at the target platform, the threshold altitude varying depending on the arrival time.

15. A method according to claim 11, wherein the decision point (MAP) is positioned by determining a longitudinal distance (D1) separating it from a tangent plane passing through the geographical coordinates of the selected target zone and orthogonal to the vertical plane in accordance with the following relationship:

$$D1=D0/[\tan(\alpha)]$$

in which "/" represents the division sign, "D0" represents the orthogonal distance, and "α" represents an offset angle set by the manufacturer.

16. A method according to claim 11, wherein during the parameter-setting step (STP2), an offset side on the vertical plane is selected relative to the target platform.

17. A method according to claim 11, wherein the final approach fix (FAF) is positioned at a minimum safe altitude (MSA), the minimum safe altitude (MSA) being equal to the maximum value between firstly a threshold minimum safe altitude and, secondly, the sum of a height of a top of the target platform plus a minimum safe constant predetermined by the manufacturer.

18. A method according to claim 11, wherein the final approach fix (FAF) is positioned at a final approach distance (DFAF) from the decision point (MAP) equal to:

$$DFAF = k1 + \frac{MSA - MINI}{\tan \beta}$$

in which "DFAF" represents the final approach distance, "k1" represents an approach constant set by the manufacturer, "MSA" represents a minimum safe altitude at which the final approach fix is positioned, "MINI" represents the minimum decision altitude (MDA), and "β" represents the angle of a flight descent segment connecting the final approach fix to a horizontal plane containing the decision point (MAP).

19. A method according to claim 17, wherein the initial approach fix (IAF) is positioned at the minimum safe altitude (MSA).

20. A method according to claim 11, wherein the initial approach fix (IAF) is positioned at an initial approach distance (DIAF) from the decision point (MAP) equal to:

$$DIAF = k1 + \frac{MSA - MINI}{\tan \beta} + k2$$

in which "DIAF" represents the initial approach distance, "k1" represents an approach constant set by the manufacturer, "k2" represents a variable determined by the manufacturer, "MSA" represents a minimum safe altitude at which the final approach fix is positioned, "MINI" represents the minimum decision altitude (MDA), and "β" represents the angle of a flight descent segment connecting the final approach fix to a horizontal plane containing the decision point (MAP).

21. A method according to claim 11, wherein the approach path includes a leveling-off point (LPO) interposed between the final approach fix (FAF) and the decision point (MAP), the leveling-off point being placed at the same minimum decision altitude (MDA) as the decision point (MAP) and at a leveling-off distance (DLPO) from the decision point (MAP) equal to:

$$DLPO = k1$$

in which "DLPO" represents the leveling-off distance, and "k1" represents an approach constant set by the manufacturer.

22. A method according to claim 1, wherein a vertical guidance module and a horizontal guidance module communicate with an autopilot system in order to guide the aircraft along the approach path prepared by the navigation module.

23. A method according to claim 1, wherein the method includes a guidance step of providing guidance during the calculated initial approach fix (IAF).

24. A method according to claim 1, wherein, the aircraft having a horizontal situation indicator provided with a scale comprising a plurality of markers, the horizontal situation indicator positioning on the scale a first symbol centered in the middle of the scale indicating the approach path and a second symbol indicating the difference in lateral position of the aircraft relative to the approach path to be followed, the difference between the first symbol and the adjacent second marker representing the value of the position integrity performance (RNP).

25. A method according to claim 1 further comprising: piloting the aircraft along the approach path to the target platform.

26. An aircraft comprising:
an onboard database including for each of a plurality of platforms a plurality of attributes including at least one attribute defining the platform and an attribute relating to a positioning error (TPE) of the platform;
a parameter-setting module in communication with the database, the parameter-setting module configured to set parameters for a distance referred to as the "lateral distance" (LOV);
a navigation module in communication with the database and the parameter-setting module, the navigation module configured to prepare an approach path to a target platform to be reached, the approach path comprising an initial approach fix (IAF), a final approach fix (FAF), and a decision point (MAP) that are present in a common vertical plane directed parallel to a course (CRS), the target platform to be reached being offset relative to the vertical plane by an orthogonal distance (D0) that is not less than the lateral distance (LOV);
an integrity-checking module configured to determine, prior to an approach flight stage of the aircraft commencing at the initial approach fix (IAF), the value of a position integrity performance (RNP) required for a localization system of the aircraft, this position integrity performance (RNP) being equal to the minimum value between firstly a predetermined performance threshold and, secondly, the quotient of the difference of the lateral distance minus the positioning error for a target platform to be reached as divided by two according to the equation:

$$RNP = \min[(LOV - TPE)/2; k3]$$

in which "RNP" represents the required position integrity performance, "LOV" represents the lateral distance, "TPE" represents the positioning error, "k3" represents the predetermined threshold performance, and "/" represents the division sign;
a GNSS localization system configured to determine, during the approach flight stage of the aircraft, the radius of a circle in which the aircraft is located referred to as the position integrity radius (HPL); and
the integrity-checking module further configured to compare the position integrity performance (RNP) with the position integrity radius (HPL) and generate an alert if the position integrity radius (HPL) is greater than the position integrity performance (RNP).

27. A method of facilitating the approach to a platform by an aircraft, comprising:
a preparatory step (STP1) of constructing a database of platforms including for each platform at least one attribute defining the platform;
a parameter-setting step (STP2) during which parameters are set for a distance referred to as the "lateral distance" (LOV);
an approach flight stage (STP4) along an approach path comprising an initial approach fix (IAF), a final approach fix (FAF), and a decision point (MAP) that are present in a common vertical plane directed parallel to a course (CRS), the target platform to be reached being offset relative to the vertical plane by an orthogonal distance (D0) that is not less than the lateral distance (LOV);
during the preparatory step (STP1), a step of storing, for each platform, an attribute relating to a positioning error (TPE) of the platform;
prior to the approach flight stage commencing at the initial approach fix (IAF), a step of using an integrity-checking calculator to determine the value of a position integrity performance (RNP) required for a localization system of the aircraft, this position integrity performance (RNP) being equal to the minimum value between firstly a predetermined performance threshold and, secondly, the quotient of the difference of the lateral distance minus the positioning error for a target platform to be reached as divided by two according to the equation:

$RNP = \min[(LOV - TPE)/2; k3]$ in which "RNP" represents the required position integrity performance, "LOV" represents the lateral distance, "TPE" represents the positioning error, "k3" represents the predetermined threshold performance, and "/" represents the division sign; and during a monitoring step performed during the approach flight stage (STP4), the aircraft being provided with a GNSS localization system determining the radius of a circle in which the aircraft is located referred to as the position integrity radius (HPL);

using the integrity-checking calculator to compare the position integrity performance (RNP) with the position integrity radius (HPL); and generating an alert if the position integrity radius (HPL) is greater than the position integrity performance (RNP).

28. A method according to claim 27 further comprising:
piloting the aircraft along the approach path to the target platform.

* * * * *